Nov. 12, 1940.   R. W. PATON   2,220,947
PISTON RING
Filed June 30, 1938   2 Sheets-Sheet 1
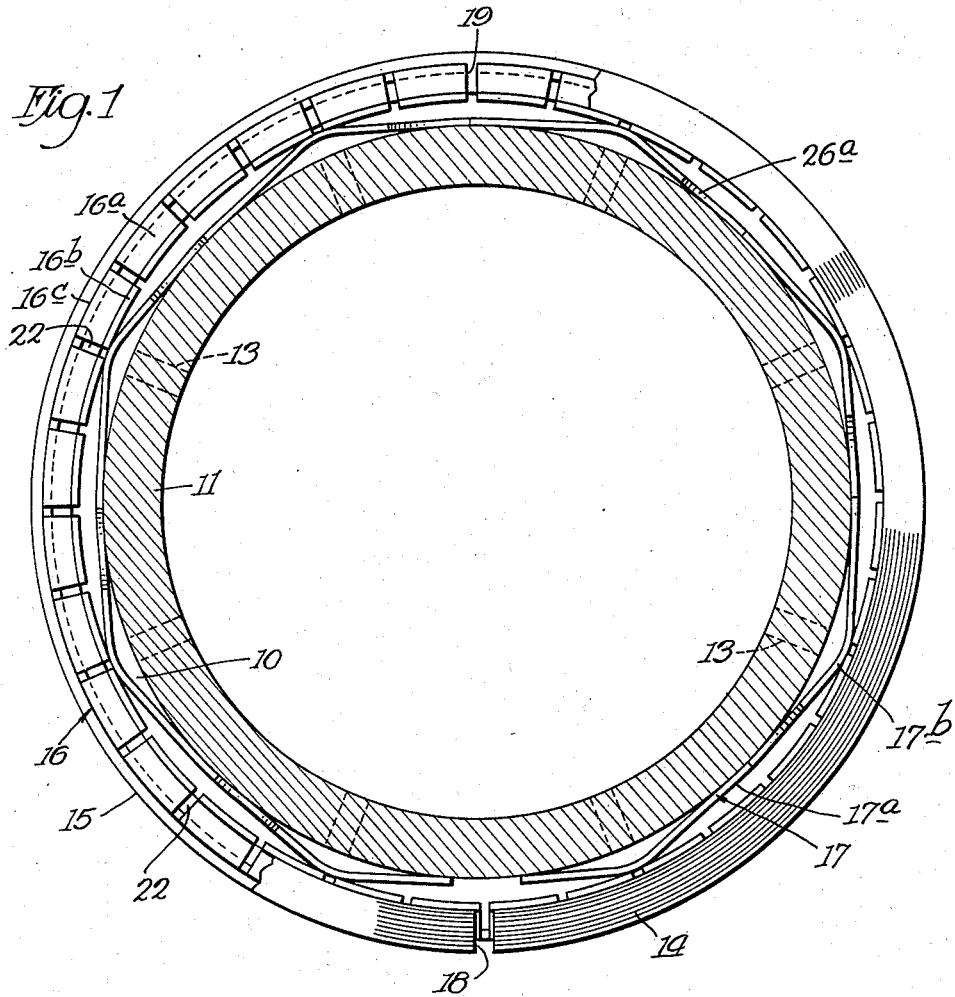
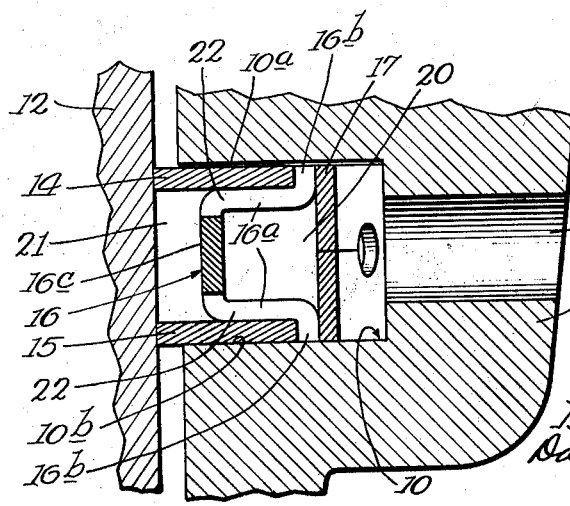
Inventor:
Roy W. Paton
By Davis, Lindsey, Smith & Shonts
Attys.

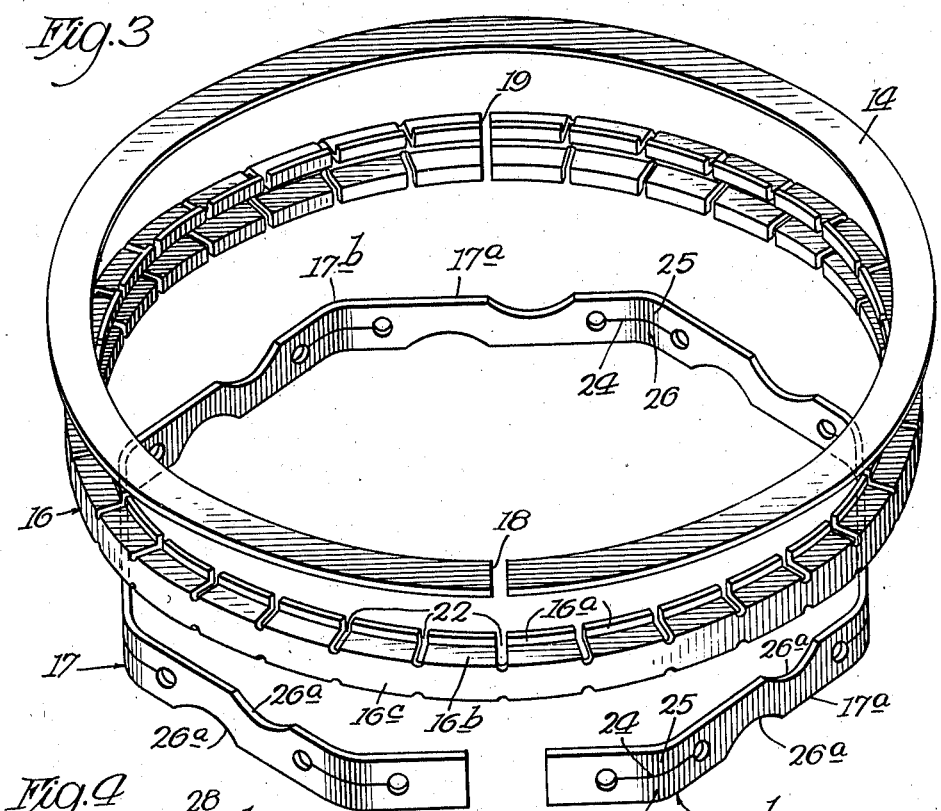
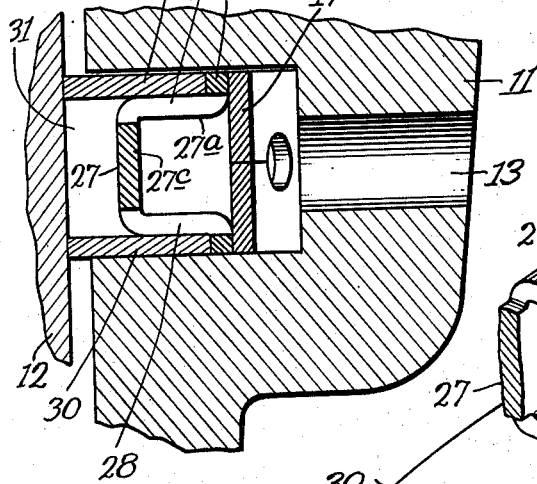

Patented Nov. 12, 1940

2,220,947

UNITED STATES PATENT OFFICE 2,220,947

PISTON RING

Roy W. Paton, Hagerstown, Ind., assignor to The Perfect Circle Company, Hagerstown, Ind., a corporation of Indiana Application June 30, 1938, Serial No. 216,642

13 Claims. (Cl. 309—45)

My invention relates to piston rings adapted to be mounted in the ring groove in a piston of an internal combustion engine having a cylinder wall to be engaged by the ring, and it has to do with multi-part rings of the foregoing character adapted for reducing oil consumption.

One of the objects of my invention is to provide an improved ring of the foregoing character which is of simple construction, is inexpensive to manufacture, and which is adapted to perform its intended functions efficiently, particularly when applied to pistons used in worn cylinders.

Another object is to provide a multi-section ring structure which includes a pair of thin, split, ring-like steel rail sections spaced apart by a split, ring-like steel spacer section of channel shape in cross section and of less width in radial direction than the rail sections and having its channel opening inwardly toward the inner face of the ring with its channel legs shaped to seat against and support the inner edges of the rail sections, the spacer section being engaged by a spring steel expander section whereby it is expanded, in turn, expanding the rail sections toward the cylinder wall.

A further object is to provide a ring of the foregoing character wherein the rail and spacer sections when assembled in the ring groove form a continuous oil channel in the outer face of the ring structure, the sides of the spacer section being provided with circumferentially spaced slots providing with the rail section radially extending slots or openings for drainage of oil from the oil channel through the ring structure.

Other objects and advantages will become apparent as this description progresses and by reference to the drawings wherein—

Figure 1 is a horizontal sectional view of a piston structure having one form of my invention mounted in a ring groove thereof;

Fig. 2 is a fragmentary and enlarged, vertical sectional view of the structure shown in Fig. 1, the same being illustrated in position in a cylinder;

Fig. 3 is a partial assembly view of the ring structure shown in Figs. 1 and 2;

Fig. 4 is a view similar to Fig. 2 of another form of structure embodying my invention; and Fig. 5 is a fragmental, perspective view of parts of the ring structure shown in Fig. 4.

Ring structure embodying my invention is adapted to be mounted in the groove 10 in a piston 11 of an internal combustion engine having a cylinder 12 in which the piston operates. The piston may take any suitable form and it is provided with an annular series of oil holes 13 leading through the piston wall from the ring groove 10 for drainage of oil from the latter back to the engine crank case (not shown). Generally speaking, the ring structure of Figs. 1 to 3, inclusive, is of unitary form, including rail sections 14, 15, spacer section 16 and expander section 17.

The rail sections 14 and 15 (Figs. 2 and 3), each of which is similarly formed, preferably from thin steel material, are of ring-like shape, split at 18. They are so constructed that when a piston 11 embodying the same is mounted in the cylinder 12, their outer edges or faces engage the cylinder wall under their own tension. These rail sections are supported and confined in operative relation to the opposite side walls 10$^a$ and 10$^b$ of the piston groove 10 by the spacer section 16.

The spacer section 16 (Figs. 2 and 3) is of ring-like shape, split at 19, and it is made of a relatively thin steel material, rolled, bent, or otherwise formed, to a rectangular-like channel shape. The spacer section 16 is adapted to be mounted between the rail sections 14 and 15 with its channel 20 opening toward the inner face of the ring structure, and the free ends of its channel sides 16$^a$ are turned laterally at substantially right angles, providing annular flanges 16$^b$ which engage and support the inner edges of the rail sections 14 and 15. The spacer section is of less width in radial direction than the rail sections so that when it is assembled with the rail sections, as illustrated in Fig. 2, there is provided an annular oil channel 21 of substantial width and depth in the outer face of the ring structure. Oil scraped from the cylinder wall into the channel 21 is drained back to the engine crank case through the piston holes 13 by radial slots or openings 22 provided in the ring structure at the upper and lower sides of the oil channel.

The openings 22 (Figs. 1 and 2) are formed by providing, throughout the channel sides 16$^a$ of the spacer section 16, a plurality of circumferentially spaced and radially extending slots, each of which slots extends entirely through the flanges 16$^b$, channel sides 16$^a$ and into the channel bottom 16$^c$ to a depth slightly greater than the thickness of the channel sides. When the rail and spacer sections are assembled with the rail sections mounted upon the channel sides of the spacer section, they cooperate to provide the radial slots or openings above mentioned. By positioning the oil drainage openings 22 in the manner stated, the drainage of the oil from the channel 21 is greatly facilitated, in that these drainage openings are located at the points toward which the oil tends to be thrown during the reciprocation of the piston. Free drainage of the oil through the ring structure is thus provided with practically no tendency toward clogging due, in part, to the positioning of the slots and the hydraulic action established during the reciprocation of the piston.

The expander section 17 (Fig. 3) takes the form of a thin band of spring steel formed to a polygonal shape having straight sides 17a joined together by rounded or arcuate corners 17b. The expander sides 17a are adapted to seat against the inner wall of the ring groove 10 (Figs. 1 and 2) and the corners 17b, which constitute spring portions, engage the inner flanged edges 16b of the spacer section 16. When the expander is assembled in the ring groove, behind the spacer section 16, as shown in Fig. 1, it tends constantly to expand the spacer section 16, in turn, expanding the supported rail sections 14 and 15 toward the wall of the cylinder 12. The corner spring portions 17a are, preferably, split centrally in longitudinal direction, as at 24 (Figs. 2 and 3), providing upper and lower independently acting spring portions 25 and 26 which engage, respectively, the upper and lower edge flanges 16b of the spacer section.

The expander section 17 is also provided with oil drainage means. To this end, the opposite side edges of each side portion 17a of the expander is provided with an elongated recess 26a, the recesses in opposite edges being so arranged that their adjacent ends overlap somewhat. It will be noted that these recesses are located substantially in flow alignment with the oil drainage slots or openings 22 between the rail and spacer sections, whereby the flow tendency of the oil toward the upper and lower parts of the structure in the reciprocation of the piston is utilized in facilitating free drainage of the oil past the expander section.

In some instances, the channel sides of the spacer section may not be slotted entirely through the out-turned rail-supporting flanges on such sides, thereby providing continuous annular flanges against which the inner edges of the rail sections are supported. Such a structure is illustrated in Figs. 4 and 5. This structure is identical with that previously described except that the channel sides 27a of the spacer section 27 are provided with closed end slots 28 which extend from the inner end of the channel side flanges 27b to the bottom 27c of the spacer. The slots 28 are cut into the channel bottom 27c to a depth slightly greater than the width of the channel sides 27a, thereby providing radially extending oil drainage slots or openings 28 through which oil may be drained from the annular channel 31 in the outer face of the ring structure.

The advantages of my invention, above first stated, will be obvious from the foregoing description. Ring structure embodying my invention provides an effective seal between the piston and the cylinder wall thereby preventing oil pumping. It is particularly useful in these regards when it is applied to worn cylinders. In the use of my invention, the tendency toward wear and break-down of the ring parts is minimized. This feature is aided by the flanges at the ends of the channel sides of the spacer section which provide a substantially wide surface or area to be engaged by the expander section.

I claim:

1. Piston ring structure adapted for use in a groove in a piston of an internal combustion engine having a cylinder wall to be engaged, which comprises a pair of thin, split, ring-like rail sections having outer edges or faces adapted to engage the cylinder wall, a thin, steel, split, ring-like spacer section of U-shape in cross section having portions extending between and behind said rail sections and forming with said rail sections a continuous, annular oil channel opening outwardly toward the cylinder wall, means providing radial slots or openings leading through the ring structure from said oil channel, and an expander section having spring portions engaging said spacer section for expanding the latter and said rail sections toward the cylinder wall when the ring structure is mounted in the piston ring groove.

2. Piston ring structure adapted for use in a groove in a piston of an internal combustion engine having a cylinder wall to be engaged, which comprises a pair of thin, split, ring-like rail sections having outer edges or faces adapted to engage the cylinder wall, a split, ring-like spacer section of channel shape in cross section having portions extending between and behind said rail sections with its channel opening toward the bottom of the ring groove and forming with said rail sections an annular oil channel opening outwardly toward the cylinder wall, means providing an annular series of circumferentially spaced, radial slots or openings between each of said rail sections and the channel sides of said spacer section, which slots are adapted to drain oil from said oil channel through the ring structure, and an expander section engaging said expander section for expanding said rail sections toward the cylinder wall when the ring structure is mounted in the piston ring groove.

3. Piston ring structure adapted for use in a groove in a piston of an internal combustion engine having a cylinder wall to be engaged, which comprises a pair of thin, split, ring-like rail sections having outer edges or faces adapted to engage the cylinder wall, a split, ring-like spacer section of channel shape in cross section between said rail sections, which spacer section is of less width in radial direction than said rail sections, the arrangement being such that said rail sections seat upon the channel sides of said spacer section and said rail sections and the bottom of said spacer section provide an annular oil channel opening outwardly toward the cylinder wall, the channel sides of said spacer sections having radially extending openings therein which together with said rail sections provide oil drainage slots extending through the ring structure from said oil channel, and means acting on said expander section for expanding said rail sections toward the cylinder wall.

4. Piston ring structure adapted for use in a groove in a piston of an internal combustion engine having a cylinder wall to be engaged, which comprises a pair of thin, steel, split, ring-like rail sections adapted to engage the sides of the ring groove, a thin, steel, split, ring-like spacer section between and spacing apart said rail sections, said spacer section being of substantially rectangular channel shape with its channel sides so shaped that they also extend behind said rail sections, said rail sections and the bottom of said spacer section forming a continuous, circumferential oil channel opening outwardly toward the cylinder wall, means providing a plurality of circumferentially spaced oil slots between at least one of said rail sections and said spacer section, and an expander section having spring portions engaging said channel sides for expanding said rail sections toward the cylinder wall when the ring structure is mounted in the piston ring groove.

5. Piston ring structure adapted for use in a groove in a piston of an internal combustion engine having a cylinder wall to be engaged, which comprises a pair of thin, split, ring-like rail sections having outer edges or faces adapted to engage the cylinder wall, a split, ring-like spacer section of rectangular-like channel shape in cross section between said rail sections, said spacer section being of less width in radial direction than said rail sections and being positioned with its channel opening inwardly toward the inner face of the ring structure and providing with said rail sections an annular oil receiving channel in the outer face of the ring structure, laterally extending flanges on the inner or free edges of the channel sides of said spacer section and against which the inner edges or faces of said rail sections seat, and an expander section having spring portions engaging said flanges for expanding said spacer section and, in turn, said rail sections toward the cylinder wall when the ring structure is mounted in the piston ring groove.

6. Piston ring structure adapted for use in a groove in a piston of an internal combustion engine having a cylinder wall to be engaged, which comprises a pair of thin, split, ring-like rail sections, a split ring-like spacer section of rectangular-like channel shape in cross section between said rail sections, said spacer section being of less width in radial direction than said rail sections and being positioned with its channel opening inwardly toward the inner face of the ring structure and providing with said rail sections an annular oil receiving channel in the outer face of the ring structure, laterally extending flanges on the free ends of the channel sides of said spacer section and against which the inner faces or edges of said rail sections seat, means providing slots in the channel sides of said spacer section, which slots together with said rail sections provide radial oil drainage slots leading through the ring structure from said oil channel, and an expander section having spring portions engaging said flanges for expanding said spacer section and, in turn, said rail sections, toward the cylinder wall, said expander section having recesses forming with the wall of the ring groove oil drainage openings substantially in flow alignment with said oil drainage slots.

7. Piston ring structure adapted for use in a groove in a piston of an internal combustion engine having a cylinder wall to be engaged, which comprises a pair of thin, split, ring-like rail sections, a split ring-like spacer section of rectangular-like channel shape in cross section between said rail sections, said spacer section being of less width in radial direction than said rail sections and being positioned with its channel opening inwardly toward the inner face of the ring structure and providing with said rail sections an annular oil receiving channel in the outer face of the ring structure, laterally extending flanges on the free ends of the channel sides of said spacer section and against which the inner faces or edges of said rail sections seat, said spacer section being provided with circumferentially spaced slots extending throughout its channel sides and said flanges providing with said rail sections a plurality of circumferentially spaced oil drainage slots extending through the ring structure from said oil channel, and an expander section including a band having spring portions therein engaging said flanges and other portions adapted to be seated in the ring groove for expanding the ring structure toward the cylinder wall, said band having recesses in its opposite edges forming with the wall of the ring groove oil drainage openings in substantially flow alignment with said oil drainage slots.

8. Piston ring structure adapted for use in the groove in a piston of an internal combustion engine having a cylinder wall to be engaged by the ring, which comprises a pair of thin, split, ring-like rail sections, a split, ring-like spacer section between said rail sections, said spacer section being of rectangular-like channel shape in cross section having its channel opening toward the inner face of the ring with its channel sides supporting said rail sections, laterally turned, continuous annular flanges at the ends of the channel sides of said spacer section and against which the inner edges of said rail sections seat, means providing a plurality of radially extending and circumferentially spaced openings between said rail and spacer sections constituting oil drainage slots leading from said flanges through the channel sides to the bottom of the spacer section, and an expander section engaging said flanges for expanding said spacer section and, in turn, said rail sections when the ring structure is mounted in the ring groove of the piston.

9. Piston ring structure adapted to be used in the groove in a piston of an internal combustion engine having a cylinder wall to be engaged by the ring, which comprises a pair of thin, split, ring-like rail sections adapted to be disposed along the opposite sides of the ring groove, a spacer section having axially spaced and substantially parallel portions disposed between and axially spacing apart said rail sections, said spacer section having other portions projecting from said parallel portions and disposed behind and engaging the inner edges of said rail sections, said spacer section being of less depth than said rail sections and providing with the latter a continuous oil channel between said rail sections opening outwardly toward the cylinder wall, an expander section adapted to be disposed between said spacer section and the bottom of the ring groove and engaging said other spacer portions to expand radially said spacer section and, in turn, said rail sections, said spaced parallel portions being constructed and arranged to provide with said rail sections radial openings through the ring structure through which oil entering said channel is drained.

10. Piston ring structure adapted for use in the groove in a piston of an internal combustion engine having a cylinder wall to be engaged by the ring, which comprises a pair of thin, split, ring-like rail sections adapted to be disposed along the sides of the ring groove, a thin, steel, split, ring-like spacer section having circumferentially spaced side portions extending radially and axially and connected in axially spaced relation, said radially extending portions being disposed between and separately spacing apart said rail sections and said axially extending portions being disposed behind and separately engaging the inner edges of said rail sections, and an expander section engaging only said spacer section for radially expanding said spacer and, in turn, said rail sections.

11. Piston ring structure adapted for use in the groove in a piston of an internal combustion engine having a cylinder wall to be engaged by the ring, which comprises a pair of thin, split, ring-like rail sections adapted to be disposed along the sides of the ring groove, a thin, steel, split, ring-like spacer section having circumferentially and axially spaced portions extending radially and circumferentially and axially spaced portions extending axially, said radially extending portions being disposed between and axially spacing apart said rail sections, said axially extending portions being disposed behind said rail sections in engagement with the inner edges thereof, and an expander section of substantially the width of the ring groove and having spring portions engaging said spacer section only for radially expanding said rail sections.

12. A spacer section adapted for use in a ring structure having a pair of thin, split, ring-like rail sections intended to be disposed along the opposite sides of the groove of a piston for an internal combustion engine, which comprises a comparatively thin, steel, split, ring-like member of U-shape in cross section and having a pair of spaced and substantially parallel side portions adapted to support the rail sections in axially spaced relation, and axially extending portions on each of said side portions adapted to engage and radially support the inner edges of the rail sections.

13. A spacer section adapted for use in a ring structure having a pair of thin, split, ring-like rail sections intended to be disposed along the opposite sides of the groove of a piston for an internal combustion engine, which comprises a comparatively thin, steel, split, ring-like member of U-shape in cross section and having a pair of spaced and substantially parallel side portions adapted to support the rail sections in axially spaced relation, and axially extending portions on each of said side portions adapted to engage and radially support the inner edges of the rail sections, said side portions being provided with radially directed openings for the drainage of oil past the ring structure to the bottom of the ring groove.

ROY W. PATON.